United States Patent [19]

Parkinson et al.

[11] Patent Number: 4,692,372
[45] Date of Patent: Sep. 8, 1987

[54] CEILING AND WALL TILE

[75] Inventors: William S. Parkinson, Dallas; Villy E. Djerf, Grand Saline, both of Tex.

[73] Assignee: Bunker Plastics, Inc., Grand Saline, Tex.

[21] Appl. No.: 878,250

[22] Filed: Jun. 25, 1986

[51] Int. Cl.$^4$ .................. D04H 1/16; B32B 7/12; B32B 15/04; B32B 17/06
[52] U.S. Cl. .................. 428/282; 428/285; 428/412; 428/921
[58] Field of Search .................. 428/48, 49, 50, 74, 428/75, 280, 282, 224, 285, 311.1, 311.5, 311.7, 412, 921

[56] References Cited

U.S. PATENT DOCUMENTS

| | | | |
|---|---|---|---|
| 3,118,516 | 1/1964 | Feid | 428/141 |
| 4,201,247 | 5/1980 | Shannon | 428/288 |
| 4,310,587 | 1/1982 | Beaupre | 428/311.5 |

Primary Examiner—William J. Van Balen
Attorney, Agent, or Firm—Newton, Hopkins & Ormsby

[57] ABSTRACT

A tile is disclosed for application to ceilings, walls, and the like, the tile having a thermoplastic or thermoset plastic film layer with a reflective backing applied thereto. The film layer is bonded to a pressed fiberboard, the finished tile exhibiting high temperature and dimensional stability, high impact resistance, and flame resistance far superior to conventional acrylic tiles. The mirrored tile is well suited for application in homes or in public buildings and areas where building codes prohibit use of mirrored glass tiles or acrylic tiles.

14 Claims, 3 Drawing Figures

U.S. Patent  Sep. 8, 1987  4,692,372
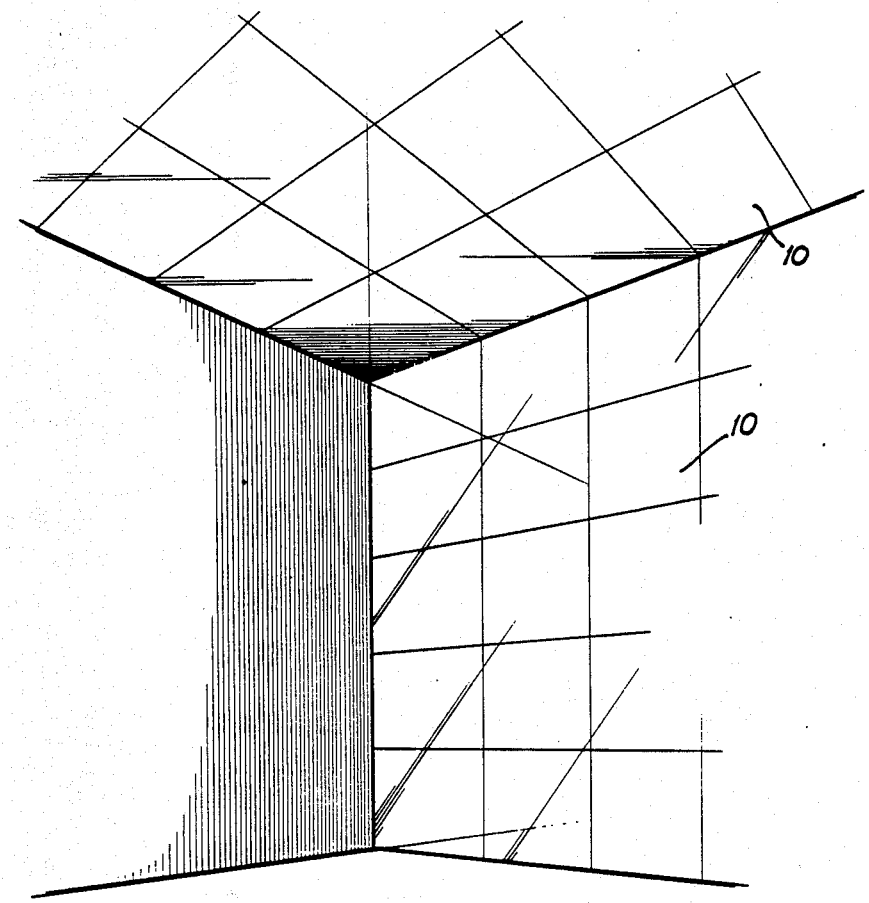
FIG 1
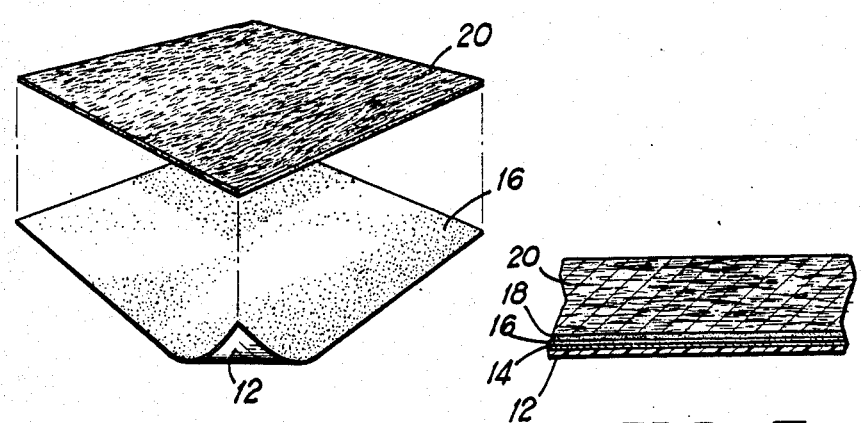
FIG 2
FIG 3

CEILING AND WALL TILE

BACKGROUND OF THE INVENTION

Many types of wall and ceiling coverings are available for decorating over conventional materials, such as for example, drywall, plaster, wood paneling, and the like. Many desirable coverings, however, are not suited for installation in public places due to certain inherent disadvantages which make them hazardous in use. For example, mirrored glass is a very desirable decorating material or covering; however, its weight and the possibility of shattering precludes its use in ceilings and walls.

Other products, for example, acrylic materials, are generally shatterproof and can be mirrored; however, they also have certain disadvantages. Acrylics and other plastics, which had been used in the past, were found to produce copious amounts of smoke and toxic fumes when burned. Since acrylic materials are also generally quite flammable, their use has also been prohibited in public buildings by most building codes.

In addition, acrylics must normally be relatively thick for providing the requisite strength and stability, thereby exhibiting substantial weight. The thickness and the composition of the material also make acrylics difficult to cut, generally requiring a saw, heated knife, or laser beam, thereby further adding to production and other costs. This same thickness also supplies a large volume of fuel should a fire occur.

SUMMARY OF THE INVENTION

It is, therefore, one of the principal objects of the present invention, to provide a ceiling and/or wall tile that meets or exceeds building code standards for non-flammability, exhibiting low indices of flame spread, fuel contribution, and smoke development, thus enabling its use in public buildings and areas.

Another object of the present invention is to provide a tile that has good dimensional stability and remains flat even when used as a ceiling tile, and which can be easily and quickly trimmed or cut to fit specific applications.

A further object of the present invention is to provide a lightweight tile that can be provided with a mirrored surface if desired, which has a high degree of reflectivity and which exhibits good acoustical properties, whether for sound reflection or soundproofing.

A still further object of the present invention is to provide a mirrored tile without the shattering or other hazards associated with glass tiles, which requires little maintenance, and which is durable to provide a long service life.

These and additional objects are attained by the present invention which relates to a ceiling and wall tile having a plastic or plastic-like sheet bonded to a fiberglass-type backing board. The assembled tile is then secured to a wall or ceiling or disposed in a grid system for suspended ceilings.

The plastic sheet may be provided with a reflective surface and the present tile provides great utility in homes, public buildings, or in product display areas at, for example, expositions and the like. The light weight and low maintenance in combination with the inherent safety features, make the present tile highly versatile.

Various additional objects and advantages will become apparent from the below description, with reference to the accompanying drawings.

BRIEF DESCRIPTION OF THE DRAWINGS

FIG. 1 is a perspective view of a portion of a room, having the present tile applied to the ceiling and vertical wall;

FIG. 2 is an exploded perspective view of the present ceiling and wall tile, illustrating the two major components prior to final assembly; and FIG. 3 is a partial cross-sectional view of the present invention, illustrating the composition thereof.

DETAILED DESCRIPTION OF THE PREFERRED EMBODIMENT

Referring now more specifically to the drawings, and to FIG. 1 in particular, numeral 10 indicates generally a tile which may be applied to a ceiling or a wall, the invention being well suited for either type of installation. Thus, throughout the application, reference to either ceiling or wall tile is meant to include the other, the invention not being limited for application to a particular surface.

In general, the invention comprises a reflective thermoplastic, thermoset plastic, or a similar composition chosen from the general class of materials. The thermoplastic or like material is supplied in sheet or roll form and is bonded to a fiberglass type board or backing. The assembled tile is then applied to ceilings or walls in any suitable manner, as will be detailed hereinbelow.

The composition of the present tile is detailed in FIGS. 2 and 3. Numeral 12 designates the thermoplastic or like sheet, a particularly suitable material being a polycarbonate film manufactured under the trademark LEXAN ® by the General Electric Co. This type of material has good temperature and dimensional stability, high impact resistance and flame resistance far superior to acrylics. The sheet may be provided in a plurality of colors and with a plurality of coatings.

One possible coating is a metal deposition, such as aluminum 14 applied to the LEXAN ® sheet in a vacuum metallizing process. Since the polycarbonate sheet is substantially transparent, the thin deposition of the aluminum metal provides a reflective or mirrored backing. Applied over the metallic layer is a layer of a suitable paint 16, such as an enamel, epoxy, or urethane paint, which prevents any damage to the aluminum, thereby preserving the appearance.

The LEXAN ® is normally supplied in a roll or as sheets, which can be easily cut to a suitable size, such as a 4'×8' or 2'×2' sheet, the 4'×8' size being generally preferred, with any additional cutting done after final assembly. The vacuum metallization is carried out in a sealed chamber at approximately 0.3 to 0.4 atmospheres, for depositing the aluminum or similar reflective material on one side of the polycarbonate sheet.

Covering the deposited reflective metal is a suitable protective means to prevent scratching of the now metallic surface, such as paint 16. The enamel, epoxy, or urethane paint is normally applied in a spray booth and the panel is then dried in suitable fashion.

The second major component of the present ceiling tile is a molded acoustical fiber board composed of compressed glass fiber material. The glass fibers are compressed to form a high density board which resists warpage, is substantially rigid, and which is easily secured to the LEXAN ® sheet with a suitable adhesive.

The fiber board provides such advantages with a minimum thickness of approximately ⅛"±0.050". Density may range from eight to twenty-four pounds per cubic foot, with a normal density of sixteen lbs./cu.ft. While essentially fireproof, further security is provided by a phenolic coating sprayed onto the fiberboard, which serves to further prevent burning and minimize water uptake. In tests run in a high humidity area, water uptake for the treated fiber board caused expansion of less than approximately 0.020 inches. Fiber length normally ranges between four inches and eighteen inches, thereby ensuring a secure bonding of the fibers when the board is formed.

The compressed fiber board 20 is normally secured to the LEXAN® sheet with a suitable securing means such as adhesive 18. The adhesive will normally be a thermoplastic or thermoset adhesive which meets or exceeds the fire code Class A with a flame spread index of 0 to 25. One such adhesive is manufactured by the 3M Corporation under the name 3M® Adhesive #34. This formula is essentially a fireproof product; however, calcium carbonate or a similar fire retardant means may be added to the glue before application to the LEXAN® sheet.

The adhesive is normally sprayed or evenly spread over the painted surface 16 of the LEXAN® sheet, thereby assuring even distribution. The fiber board is then moved into place and pressed against the adhesive-bearing surface. This final assembly step is normally carried out in a press having a platen heated to approximately 200° F. The combination of heat and pressure quickly secures the elements together, with only five to ten seconds being required to secure the assembly, while the relatively low temperature has no adverse effect on the LEXAN® sheet. The finished tiles may also be air-dried in a spray booth using an exhaust fan system, or the tiles may be dried in a drying tunnel which uses a series of heating elements.

The finished tiles are relatively thin and pliable enough to be cut to size in a shear or steel rule die cutter, or trimmed to size with tin snips or the like for fitting around obstacles such as columns. This provides substantial economic and functional advantages over prior art tiles produced with acrylics. The prior art acrylic tiles are much thicker and quite brittle compared to the present invention, and cutting or trimming these tiles requires a laser or water cutting device or a power saw. With the present tiles, however, cutting or trimming is easily accomplished and any desired shape can be produced in a stamping operation.

The finished tiles may be laid in a grid structure to form a ceiling, or the tiles may be adhesively secured to a ceiling or wall. A number of suitable adhesives are available, such as fireproofed contact cement or caulking compounds, the high density of the fiber board serving to resist substantial absorption of the adhesive. The same high density also serves to make the present tiles dimensionally stable, thereby resisting warping or sagging of tiles laid in grid systems, and provides good acoustical performance, further adding to the utility of the present invention.

Flame tests have been conducted on the present tiles, the results being reported below. The tests were conducted in a flame tunnel. Reference data was obtained and furnace operation checked by conducting a ten minute test with glass-reinforced cement board and with red oak flooring as controls. These tests provided the 0 and 100 references, respectively, for flame spread, fuel contribution, and smoke developed. Ignition over the burners was generally noted in approximately fifty seconds for the red oak flooring. Each specimen to be evaluated was tested in accordance with the standard procedure.

| Test Specimen | Flame Spread Index E84-81a | Fuel Contribution | Smoke Developed |
|---|---|---|---|
| Glass-reinforced cement board | 0 | 0 | 0 |
| Red oak flooring | 100 | 100 | 100 |
| Acrylic tiles | 300 | 80–90 | 750–800 |
| Present invention | 20 | 0 | 315 |

In the tests run on acrylic tiles with a fiberboard backing, the materials most commonly used prior to the present invention, the fiberboard served to insulate the acrylic up to a certain point and temperature, at which time the tiles exploded in the test tunnel from the heat buildup around the high-mass flammable acrylic. The present tiles, by contrast, have virtually no flammable components and very low mass, thus providing a margin of safety heretofore thought unattainable.

Further advantage is found in the high reflectivity of the present tile 10 and the low distortion of the mirrored LEXAN® surface. Distortion with very thin plastics is normally high due to warping or sagging of the material, while with the relatively thick acrylic, distortion is high due to the thickness of the material.

The instant invention avoids these disadvantages, the fiberboard backing 20 serving to further stabilize the LEXAN® film 12, thereby preventing distortion of the highly reflective sheet. This combination is especially suited for ceiling applications requiring low weight and high dimensional stability in which the tiles are laid in the grid system of a suspended ceiling.

Maintenance of the appearance of the finished tiles is also very easy. The LEXAN® film is electrostatic, thus a suitable anti-static spray is used to discourage dust accumulation, while cleaning of the tiles is easily accomplished with water or a suitable glass cleaning fluid. The invention thus provides a ceiling or wall tile with reflectivity rivaling mirrored glass tiles, but without the weight or danger from shattering glass, and without the fire hazard present in conventional acrylic tiles. The present tiles are well suited for use in public buildings or areas, as well as in homes, and with their high dimensional stability, can be used in suspended ceilings without distortion from warping or sagging.

While an embodiment of a ceiling or wall tile has been shown and described in detail herein, various changes and modifications may be made without departing from the scope of the present invention.

We claim:

1. A tile, comprising a light-transmitting film layer of polycarbonate, said film layer having a mirrored backing on one side thereof and having another side opposite said one side being left uncovered, a backing means for providing dimensional stability for said tile, and means for securing said backing means to said mirrored backing.

2. A tile as defined in claim 1 in which said backing means includes a fiber board formed from glass fibers and compressed into flattened form and having a phenolic coating sprayed thereon.

3. A tile as defined in claim 2 in which said glass fibers have lengths within the range of four inches to one inch.

4. A tile as defined in claim 1 in which said securing means includes a fireproof adhesive material and a flame retardant means.

5. A tile as defined in claim 4 in which said flame retardant means includes calcium carbonate.

6. A tile as defined in claim 4 in which said backing means includes a fiber board formed from glass fibers and compressed into board form having a density within the range of from eight to twenty-four pounds per cubic foot and having a phenolic coating sprayed thereon.

7. A tile as defined in claim 6 in which said glass fibers have lengths within the range of four inches to eighteen inches, and said fiber board has a minimum thickness of one-eighth inch.

8. A tile as defined in claim 1 in which said mirrored backing comprises aluminum, and wherein said tile includes a paint layer over said aluminum for protecting the aluminum.

9. A tile as defined in claim 8 in which said securing means comprises a fireproofed adhesive material and a flame retardant means.

10. A tile as defined in claim 9 in which said flame retardant means includes calcium carbonate.

11. A tile as defined in claim 8 in which said board member includes a compressed fiber board having a phenolic coating applied thereto.

12. A tile for application as a ceiling or wall covering comprising a substantially transparent film selected from the group consisting of flame-resistant thermoplastics and flame-resistant thermoset plastics, said film having a reflective metallic coating on one side thereof with a protective means applied over said coating the other side of said film opposite said one side being left uncovered, a substantially planar fiberglass board member for providing dimensional stability to said tile said board member positioned over said protective means, and an adhesive means disposed between said protective means and said board member for securing said protective means to said board member.

13. A tile as defined in claim 12 in which said film is a polycarbonate sheet.

14. A tile as defined in claim 1, wherein said tile includes means for securing said backing means to a substrate surface.

* * * * *